United States Patent [19]
Skaggs et al.

[11] Patent Number: 5,876,619
[45] Date of Patent: Mar. 2, 1999

[54] SCLEROGLUCAN AS A RHEOLOGICAL MODIFIER FOR THERMAL INSULATION FLUIDS

[75] Inventors: C. Bryan Skaggs; John M. Swazey, both of San Diego, Calif.

[73] Assignee: Monsanto Company, St. Louis, Mo.

[21] Appl. No.: 825,640

[22] Filed: Apr. 1, 1997

[51] Int. Cl.$^6$ .............. C09K 3/18; F16L 59/00; C08L 5/00
[52] U.S. Cl. ............ 252/70; 106/13; 106/14.41; 106/217.7; 252/62; 252/315.3; 536/123.12
[58] Field of Search .................. 106/13, 217.7, 106/14.41; 252/70, 315.3, 62; 536/123.12

[56] References Cited

U.S. PATENT DOCUMENTS

| | | | |
|---|---|---|---|
| 3,301,848 | 1/1967 | Halleck | 536/123.1 |
| 5,224,988 | 7/1993 | Pirri et al. | 106/162.1 |
| 5,290,768 | 3/1994 | Ramsay et al. | 514/54 |
| 5,306,340 | 4/1994 | Donche et al. | 536/123 |
| 5,330,015 | 7/1994 | Donche et al. | 175/61 |

OTHER PUBLICATIONS

Chemical Abstract No. 107:12659 which is an abstract of Japanese Patent Specification No. 61–267503 (Nov. 1986).
Chemical Abstract No. 109:173316 which is an abstract of French Patent Specification No. 2600336 (Dec. 1987).
Chemical Abstract No. 111:80254 which is an abstract of a article entitled "Dynamic . . . Polymer Solutions" by Soules et al (1988) [No month given].
Chemical Abstract No. 113:117370 which is an abstract of European Patent Specification No. 370911 (May 1990).
Chemical Abstract No. 117:193923 which is an abstract of Canadian Patent Specification No. 2024599 (Mar. 1992).
WPIDS Abstract No. 77:61623Y which is an abstract of Japanese Patent Specification No. 52–083913 (Jul. 1977).
WPIDS Abstract No. 84:090688 which is an abstract of Great Britain Patent Specification No. 2127462 (Apr. 1984).
WPIDS Abstract No. 86:240552 which is an abstract of Great Britain Patent Specification No. 2172008 (Sep. 1986).
WPIDS Abstract No. 88:121235 which is an abstract of European Patent Specification No. 266163 (May 1988).
WPIDS Abstract No. 92:202148 which is an abstract of Great Britain Patent Specification No. 2250761 (Jun. 1992).
JAPIO Abstract No. JP357008297A which is an abstract of Japanese Patent Specification No. 57–008297 (Jan. 1982).
JAPIO Abstract No. JP407003076A which is an abstract of Japanese Patent Specification No. 07–003076 (Jan. 1992).

*Primary Examiner*—Anthony Green
*Attorney, Agent, or Firm*—Fitzpatrick, Cella, Harper & Scinto

[57] ABSTRACT

This invention is directed to a rheologically modified composition containing scleroglucan in an polyol base fluid. The amount of scleroglucan present in the composition is an effective amount to viscosity an polyol base fluid to the point of substantially reducing convection flow in the composition. The composition may be used as an effective thermal insulation material. Applications for this type of insulating material include, among others, use as a de-icing fluid and use as a pipeline insulator. The rheologically modified insulation composition of this invention may be particularly suitable for maintaining high oil temperature during conveyance within a pipe located in a relatively low temperature environment such as sea water.

8 Claims, No Drawings

SCLEROGLUCAN AS A RHEOLOGICAL MODIFIER FOR THERMAL INSULATION FLUIDS

BACKGROUND OF THE INVENTION

1. Field of the Invention

This invention relates to rheologically modified scleroglucan compositions that can be used as insulating fluids. These compositions advantageously demonstrate long term stability to high temperatures and metal ion contaminants.

2. Background of the Invention

The conveyance of oil obtained from offshore fields requires specially designed systems. Sometimes, the temperature of oil, pumped from beneath the ocean floor, is about 104°–121° C. (220°–250° F.). The temperature of the water through which the oil must be conveyed can be as low as 0°–10° C. (32°–50° F.). Any system for conveying oil through such a low temperature environment must provide a suitable means for insulating the oil from the low temperature of the surrounding environment.

Failure to provide adequate insulation results in reduction of the oil temperature. It is important to maintain high oil temperature to retain low viscosity and high pumpability of the oil as it is pumped through the pipeline. As the temperature decreases, the viscosity of the oil increases making it more difficult to pump. Further, at lower temperatures, separation and crystallization of the various hydrocarbon fractions present in the oil may result. For example, paraffins, low viscosity hydrocarbons, medium viscosity hydrocarbons, oil sludge, and the like, may deposit on the pipeline walls gradually restricting oil flow. Thus, the means of conveyance, typically pipelines, must be insulated to achieve efficient flow of the oil.

Means of insulating oil pipelines are known. For example, Ramsay, et al., U.S. Pat. No. 5,290,768, describes the use of welan gum/ethylene glycol compositions as insulating compositions for oil pipelines. A chelating agent, such as ethylenediamine tetraacetic acid, is present in these compositions to minimize the deleterious effects of metal ion contaminants present in pipeline pumping operations.

Scleroglucan compositions have been used in oil recovery operations. Donche, et al., U.S. Pat. No. 5,306,340 describes cementation spacers for use in oil drilling operations composed of aqueous based compositions of unrefined scleroglucan, wherein the scleroglucan contains at least 15% mycelium. These aqueous based compositions contain 0.1% to 2% scleroglucan/mycelium and may additionally contain 1% to 10% polyol or dialdehyde; the balance of the compositions being water. The polyol-containing aqueous compositions may be prepared by dispersing a paste, composed of scleroglucan/mycelium and polyol, in water. Generally, the paste is comprised of 10 to 30% scleroglucan (containing at least 15% mycelium), 70 to 90% polyol and 0 to 10% water. The high relative concentration of scleroglucan in the paste provides a mixture wherein the scleroglucan particles are coated, but not solvated by the polyol. These scleroglucan pastes, as described in this reference, would not be effectively pumpable and thus, would not be useful as oil pipeline insulating materials.

Although the aqueous based scleroglucan compositions of Donche are reportedly effective as cementation spacers during oil drilling operations, such compositions are incompatible with insulation applications, wherein the operating temperatures are often much higher than the boiling point of water. Additionally, the high water content of these compositions would have a very corrosive effect on the metal pipes used in oil pipeline operations.

Accordingly, a rheologically modified composition that functions as an effective insulating material, is non-corrosive, and demonstrates long term stability to high temperatures and metal ion contaminants would be highly desirable for oil pipeline insulation applications.

SUMMARY OF THE INVENTION

This invention is directed to a rheologically modified composition comprising a solution of scleroglucan in a polyol base fluid. The amount of scleroglucan present in the rheologically modified composition is an amount effective to viscosity the polyol base fluid to the point of substantially reducing convection flow, yet maintaining pumpability of the composition. The substantial reduction of convection flow within the rheologically modified composition of this invention provides a material which is a highly effective thermal insulator. Thus, the present invention is further directed to a method of using the above-described rheologically modified composition as an insulating material, e.g., such as a de-icing fluid or as a pipeline insulator. The rheologically modified insulating composition of this invention is particularly suitable for maintaining relatively high oil temperature during conveyance within a pipe located in a relatively low temperature environment, such as sea water.

DETAILED DESCRIPTION OF THE INVENTION

The present invention provides a rheologically modified composition having advantageous flow properties as well as insulating capabilities. As described herein, a rheologically modified composition is a composition that will liquefy when agitated, stirred or shaken, but provides rapid viscosity development when at rest. The rheologically modified composition of this invention provides enhanced insulating properties and advantageously possesses flow characteristics that enable the composition to be easily conveyed using conventional industrial pumping systems.

The rheologically modified composition of the present invention comprises a solution of scleroglucan and an polyol base fluid. Significantly, the amount of scleroglucan present in the composition is effective to viscosify the polyol base fluid to the point of substantially reducing convection flow in the composition. As used herein, the term "scleroglucan" refers to a non-ionic polysaccharide polymer produced by fermentation of carbohydrates by organisms of the family Sclerotium. Scleroglucan can be produced from a variety of carbohydrate sources, including, but not limited to, sucrose, D-mannose, D-xylose, D-glucose, L-arabinose, D-galactose, D-fructose, maltose, and raffinose. The polysaccharide polymer so produced is very rigid because of its triple helix molecular structure. Scleroglucan is characterized by a multiplicity of D-glucose units attached together in a straight chain through beta 1,3 linkages, with appended glucose units attached at various intervals to the main chain through beta 1,6 linkages.

The preparation of scleroglucan is well known. For example, U.S. Pat. No. 3,301,848, and U.S. Pat. No. 5,224,988, the disclosures of both of which are incorporated by reference herein, describe a method and media for producing scleroglucan by fermentation.

The scleroglucan used in this invention may be in liquid form, which is generally the fermentation broth, or in solid form, but is preferably used as a solid in dry powder form. The amount of scleroglucan used in this invention is about 0.1% to about 3% and preferably about 0.25% to about 1.0% by weight of the composition.

Scleroglucan is readily dispersible in hot or cold water and produces highly viscous gels when so dispersed. The flow characteristics of scleroglucan gels are preferred to gels formed from such natural gums, such as guar. The scleroglucan gels demonstrate much less resistance to flow at high flow rates than guar gum gels. Scleroglucan gels are stable from pH 1 to 12.2 and are resistant to the effects of sodium chloride. The triple helix structure of scleroglucan makes it possible to maintain its viscosity-enhancing ability at high temperatures.

Unlike aqueous scleroglucan gels, the rheologically modified compositions of this invention are comprised of a polyol base fluid. The compositions of this invention contain only minor amounts of water, generally less than about 10%, and preferably between about 1% to about 5% by weight of the composition. Thus, these compositions do not possess the corrosive properties or thermal sensitivities of the prior art aqueous gels which contain approximately 90% to 99% water. The polyol base fluids employed in this invention posses higher boiling points and lower freezing points than water. Typical polyol base fluids that may be used in the rheologically modified composition of this invention include, but are not limited to, polyhydric alcohols, e.g. glycerine; and glycols, e.g., ethylene glycol. The preferred polyol base fluid is glycerine. The base fluids can be used alone or in combination with other solvents that are miscible with the base fluid. The amount of polyol base fluid used in this invention is about 90% to about 99%, and preferably about 95% to about 99% by weight of the composition.

Preferably, these compositions may also contain sequestrants or corrosion inhibitors. Examples of useful sequestrants include, but are not limited to, polyphosphates, e.g., pyrophosphate, metaphosphate; hydroxy acid salts, e.g., sodium citrate, sodium gluconate; aminopolycarboxylic acids, e.g., ethylenediamine tetraacetic acid, nitrilotriacetic acid; hexahydric alcohols, e.g., sorbitol and mannitol. If present, the amount of sequestrant used in this invention is about 0.05% to about 1% by weight of the composition.

Corrosion inhibitors that may be useful in the present invention include, but are not limited to, surfactants, e.g. N-laurylsarcosine (used as Hamposyl-O®, a product of W.R. Grace, Co.), triethanolamine, fatty diamines, phosphonates, acetylenic alcohols, poly-oxy-alkylated amines and poly-oxy-alkylated imidazolines. A preferred corrosion inhibitor is N-laurylsarcosine. If present, the amount of corrosion inhibitor used in this invention is about 0.01% to about 1% by weight of the composition.

Another aspect of this invention is directed to a method of using the rheologically modified composition as an insulating material for the transport of a temperature sensitive fluid, e.g., oil, through a lower temperature environment surrounding the temperature sensitive fluid. This may be accomplished by placing a fluid transport member, such as pipe, or a collection of fluid pipes, within a carrier pipe. The carrier pipe is sufficiently larger in diameter, than the fluid transport member to provide an insulating chamber. This arrangement permits the fluid transport member to be insulated from the lower temperature environment. Introduction of the rheologically modified composition of this invention into the insulating chamber surrounds or encases the fluid transport member to provide a stable and effective insulating system, which reduces the heat loss of fluid during the transporting operation.

The temperature sensitive fluid for which the above described method is especially useful is oil, particularly that obtained from undersea oil wells. Such oil, naturally having a temperature greater than that of the sea, is insulated from the lower sea temperature and retains its naturally elevated temperature as it flows through pipelines to reach the ocean surface or land based oil collection facilities.

The composition also aids in ballasting of pipe bundles. Conventional insulation materials such as extruded foams and insulation wrappings, which are low density materials, do not provide such stability.

The composition is also useful as a thickened de-icing fluid, especially for aircraft and other machinery that needs to be kept free of ice build-up in freezing weather.

In addition to the uses described above, the rheological properties of the composition of this invention make it suitable for use as an oil well insulating packer material, a ballast material, a non-petroleum based hydraulic material for motor actuating cylinders and a reservoir work over completion "kill" material.

The insulation capacity of the composition is such that either longer sea bed lines or slower production rates through shorter lines is possible, while end line minimum oil temperatures are maintained.

Significantly, the composition of this invention is thermally stable in the presence of cations. Cations can deleteriously impact insulation fluids by cross-linking the viscosifying cellulose or polysaccharide materials. Steel or concrete pipes, used to contain the insulation fluid, serve as sources for cation contaminants. Steel pipes may introduce iron or other metal ions into the insulation fluid and concrete pipes may introduce calcium ions into the insulation fluid. The rheologically modified compositions of the present invention are advantageously stable in the presence of metal ions without the need of added metal sequestrants. The deleterious effects of cations is reduced, in part, because of the non-ionic character of the scleroglucan polysaccharide polymer.

The composition of this invention possesses other advantageous properties. The composition will remain stable despite a high degree of sea water invasion into the insulating pipeline. The polyol base fluids are miscible in water. The scleroglucan in the polyol base fluid are compatible with water and salt water. Furthermore, the miscibility of the polyol base fluid in water ensures that no lasting detrimental effects to the environment will result in the event of spillage of the composition.

The Examples which follow are intended as an illustration of certain preferred embodiments of the invention, and no limitation of the invention is implied. The scleroglucan used in these Examples was manufactured by Sanofi Bio Industries (France) from *Sclerotium rolsfii*. Both scleroglucan grades of Actigum CS-11 and Actigum CS-6 were used to form the rheologically modified compositions of this invention. Actigum CS-11 is a refined grade of scleroglucan containing 10% mycelium residues; Actigum CS-6 is an unrefined grade containing approximately 25% of mycelium residues. Mycelium is the filamentous component of the fungus that produced the scleroglucan and is isolated with the scleroglucan from the fermentation medium. No significant difference in performance was observed between the two grades of scleroglucan.

EXAMPLE 1

(Insulating Composition 1)

Into a 1 liter beaker, immersed in a water bath (room temperature), was added 96–99% glycerine (300 ml) and scleroglucan (1.5–3.0 g). The scleroglucan was added to the glycerine with vigorous stirring using a Lightnin' Mixer, equipped with a propeller blade at a speed of about 600 rpm. After the scleroglucan was well dispersed, the temperature of the water bath was raised to 88°–93° C. (190°–200° F.). Mixing of the scleroglucan/glycerine dispersion was then continued for at least one hour at 88°–93° C. (190°–200° F.). The resulting scleroglucan/glycerine solution was removed from the water bath, centrifuged to remove air bubbles and the resulting solution was allowed to cool to room temperature.

COMPARATIVE EXAMPLE 1

(Comparative Insulating Fluid 1)

Ethylene glycol and welan gum (0.57%) were combined in a glass vessel. A blender-blade assembly (Oster or Waring) was attached to the vessel and the mixture was blended at high speed for 10 to 20 minutes. The blended mixture was de-gassed under vacuum.

High Temperature Stability Test Method

The scleroglucan/glycerine fluid of Insulating Composition 1 (180 ml) was placed in a clear, heat-resistant container. Mild steel corroded coupons were added to the clear fluid. An approximate gel:metal surface ratio of 6 $cm^3/cm^2$ was used. The corroded metal coupons were used to simulate the iron present in a sub-sea insulation pipeline. The remaining volume of the container was purged with a stream of nitrogen and a cover was secured on the container. The container was placed in an oven at 110° C. or 125° C. (230° F. or 257° F.) and observed periodically over a 6 month period. The sample of 0.5% scleroglucan/glycerine showed excellent stability over the entire 6 month period at 110° C. (230° F.). The sample of 1% scleroglucan/glycerine was stable for over 3 months at 125° C. (257° F.).

The welan gum/ethylene glycol fluid of Comparative Insulation Fluid 1 was placed in a clear heat-resistant container and stored at 125° C. (257° F.). No corroded steel coupons were added. Within 5 days gel with syneresis was observed. Syneresis of a gel occurs when free, unviscosified liquid accumulates. A fluid or gel that demonstrates syneresis would be considered "not acceptable".

Other variations or modifications, which will be obvious to those skilled in the art, are within the scope and teachings of this invention. This invention is not to be limited except as set forth in the following claims.

We claim:

1. A rheologically modified composition comprising a solution of scleroglucan in a polyol base fluid, wherein the scleroglucan is present in an amount of about 0.1% to about 3% by weight of the composition, the polyol base fluid is glycerine or ethylene glycol and the composition contains less than about 10% water.

2. A composition according to claim 1, further comprising a sequestrant in an amount of about 0.05% to about 1% by weight of the composition.

3. A composition according to claim 1, further comprising a corrosion inhibitor in an amount of about 0.01% to about 1% by weight of the composition.

4. A composition according to claim 1, wherein the scleroglucan is present in an amount of about 0.25% to about 1.0% by weight.

5. A rheologically modified composition comprising a solution of scleroglucan and glycerine, wherein the scleroglucan is present in an amount of about 0.1% to about 3% by weight of the composition and the composition contains less than about 10% water.

6. A composition according to claim 5, wherein the scleroglucan is present in an amount of about 0.25% to about 1.0% by weight.

7. A method of using a rheologically modified composition as a thermal insulation fluid comprising the step of:

surrounding an outer surface of a fluid transport member with a rheologically modified composition comprising scleroglucan and a polyol base fluid, wherein the scleroglucan is present in an amount effective to viscosify the polyol base fluid to substantially reduce convection flow in the composition and wherein the polyol base fluid is glycerine or ethylene glycol.

8. A method using a rheologically modified composition as a de-icing agent for coating a surface of an object, said method comprising the step of:

applying, to an outer portion of the surface of the object, a rheologically modified composition comprising scleroglucan and a polyol base fluid, wherein the scleroglucan is present in an amount effective to viscosify the polyol base solvent to substantially prevent the composition from flowing off the surface of the object and wherein the polyol base fluid is glycerine or ethylene glycol.

* * * * *